United States Patent
Liu et al.

(10) Patent No.: US 7,583,729 B2
(45) Date of Patent: Sep. 1, 2009

(54) ADAPTIVE EQUALIZER AND RELATED METHOD THEREOF

(75) Inventors: Pi-Hai Liu, Taipei (TW); Meng-Ta Yang, Miao-Li Hsien (TW)

(73) Assignee: MediaTek Inc., Hsin-Chu Hsien (TW)

( * ) Notice: Subject to any disclaimer, the term of this patent is extended or adjusted under 35 U.S.C. 154(b) by 753 days.

(21) Appl. No.: 11/161,532

(22) Filed: Aug. 8, 2005

(65) Prior Publication Data

US 2006/0114982 A1 Jun. 1, 2006

(30) Foreign Application Priority Data

Nov. 29, 2004 (TW) .............................. 93136781 A (51) Int. Cl.
*H03K 5/159* (2006.01)
*H03D 1/00* (2006.01)
(52) U.S. Cl. ...................................... 375/232; 375/341
(58) Field of Classification Search ................. 375/341, 375/232
See application file for complete search history.

(56) References Cited

U.S. PATENT DOCUMENTS

| 6,084,907 A * | 7/2000 | Nagano et al. .............. 375/230 |
| 6,385,239 B1 | 5/2002 | Okamoto et al. |
| 6,678,230 B2 | 1/2004 | Miyashita et al. |
| 7,174,087 B2 * | 2/2007 | Takiguchi et al. ............. 386/93 |
| 7,286,596 B2 * | 10/2007 | Sawada et al. .............. 375/231 |
| 7,366,234 B2 * | 4/2008 | Yamamoto et al. .......... 375/232 |
| 2005/0063275 A1 | 3/2005 | Yamamoto et al. |

* cited by examiner

*Primary Examiner*—Shuwang Liu
*Assistant Examiner*—Nader Bolourchi
(74) *Attorney, Agent, or Firm*—Winston Hsu (57) ABSTRACT

An adaptive equalizer and the related method are disclosed. The adaptive equalizer is capable of adjusting its own equalization coefficients, and includes a reference signal generator for generating a reference signal according to a first reference source, an equalization unit for generating an equalized signal by processing a received signal through a plurality of equalization coefficients, a weighted signal generator for generating a weighted signal according to a second reference source, and a coefficient adapting circuit for adjusting the equalization coefficients according to the reference signal, the equalized signal, the weighted signal, and the received signal.

56 Claims, 8 Drawing Sheets

nication increases with each passing day. In order to raise the
ADAPTIVE EQUALIZER AND RELATED METHOD THEREOF

BACKGROUND

The invention relates to an adaptive equalizer and related method thereof, and more particularly, to an adaptive equalizer and related method capable of utilizing a weighted signal for controlling the adjustment weight of the equalization coefficients.

In communication systems, utilization of digital communication increases with each passing day. In order to raise the performance of the transmission device, it is important to overcome the non-ideal properties of the transmission channel. Common communication systems adopt equalizers in the front ends of receivers to decrease the effects of these non-ideal properties. The equalizer reduces the channel noise and other interference of the received data, so as to decode the received data more precisely. As a result, the transmission quality is guaranteed. Take the adaptive equalizer as an example, the adaptive equalizer utilizes a plurality of equalization coefficients to equalize a received signal, and adjusts the equalization coefficients according to the received signal and a reference signal. The reference signal may be a training sequence or a bit stream corresponding to a computing result of a slicer decoder or a Viterbi detector. The slicer decoder determines the received signal to be "0" or "1" by comparing the equalized signal with a slicing threshold. The Viterbi detector determines the received signal to be "0" or "1" by considering the relationship of a series of received data. Hence, the accuracy of the Viterbi detector is higher than the slicer decoder.

Figure 1:
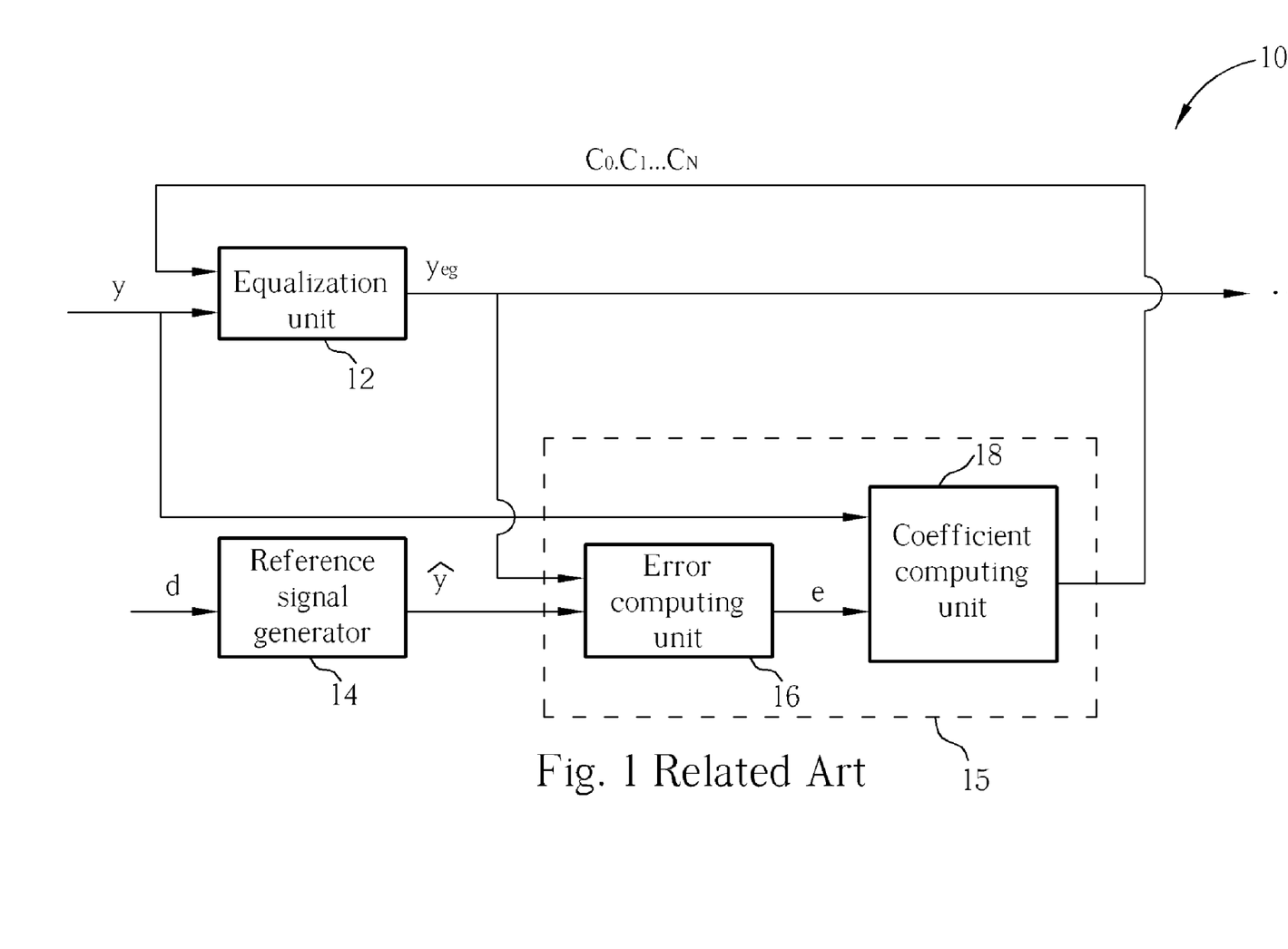
FIG. 1 is a functional block diagram of a related art adaptive equalizer.

Please refer to FIG. 1. FIG. 1 is functional block diagram of a related art adaptive equalizer 10. The adaptive equalizer 10 comprises an equalization unit 12, a reference signal generator 14, and a coefficient adapting circuit 15. The coefficient adapting circuit 15 includes an error computing unit 16 and a coefficient computing unit 18. Firstly, the equalization unit 12 utilizes a plurality of equalization coefficients $C_0(0)$, $C_1(0)$, ..., $C_N(0)$ to process a received signal y, and then generates an equalized signal $y_{eq}$ accordingly. The operation of the equalization unit 12 will be detailed in the following paragraph. Secondly, the reference signal generator 14 generates a desired signal $\hat{y}$ by utilizing a training sequence, or by utilizing the bit stream d outputted by a slicer decoder or a Viterbi detector. Thirdly, the error computing unit 16 subtracts a desired signal $\hat{y}$ from the equalized signal $y_{eq}$ to generate an error signal e. Finally, the coefficient computing unit 18 utilizes the received signal y and the error signal e to perform a Least Mean Square (LMS) operation to update the plurality of equalization coefficients to be $C_0(1), C_1(1) \ldots , C_N(1)$. The equalization coefficients as $C_0, C_1, \ldots , C_N$ will approach proper values by repeating the operation mentioned above several times. The operation of the related art coefficient computing unit 18 is represented in the following equation:

$$C_j(k)=C_j(k-1)-\tau \cdot e(k) \cdot y(k-j) \qquad \text{Equation (1)}$$

In Equation (1), $\tau$ denotes a coefficient adjustment factor, which can be a predetermined value or an adjustable value relating to the channel environment. When the variation of the channel environment is very high, $\tau$ can be determined to be a greater number, which causes the equalization coefficients $C_0, C_1, \ldots , C_N$ to be adjusted substantially and to enter a stable state (i.e. are convergent) quickly. On the contrary, if $\tau$ is set to be a smaller number, the equalization unit 12 will take more time to let the equalization coefficients $C_0, C_1, \ldots , C_N$ enter the stable state. In addition, if $\tau$ is set to be a smaller number, the probability of the equalization coefficients $C_0$, $C_1, \ldots , C_N$ not being convergent is reduced. Hence, the system error rate is reduced at the same time. As the equalization coefficients $C_0, C_1, \ldots , C_N$ are updated several times, the error signal e approaches zero. As a result, the equalization coefficients $C_0, C_1, \ldots , C_N$ enter the stable state. Until the channel environment changes, the error signal e increases, then the adaptive equalizer 10 adjusts the equalization coefficients $C_0, C_1, \ldots , C_N$ utilized by the equalization unit 12 in the same manner.

Figure 2:
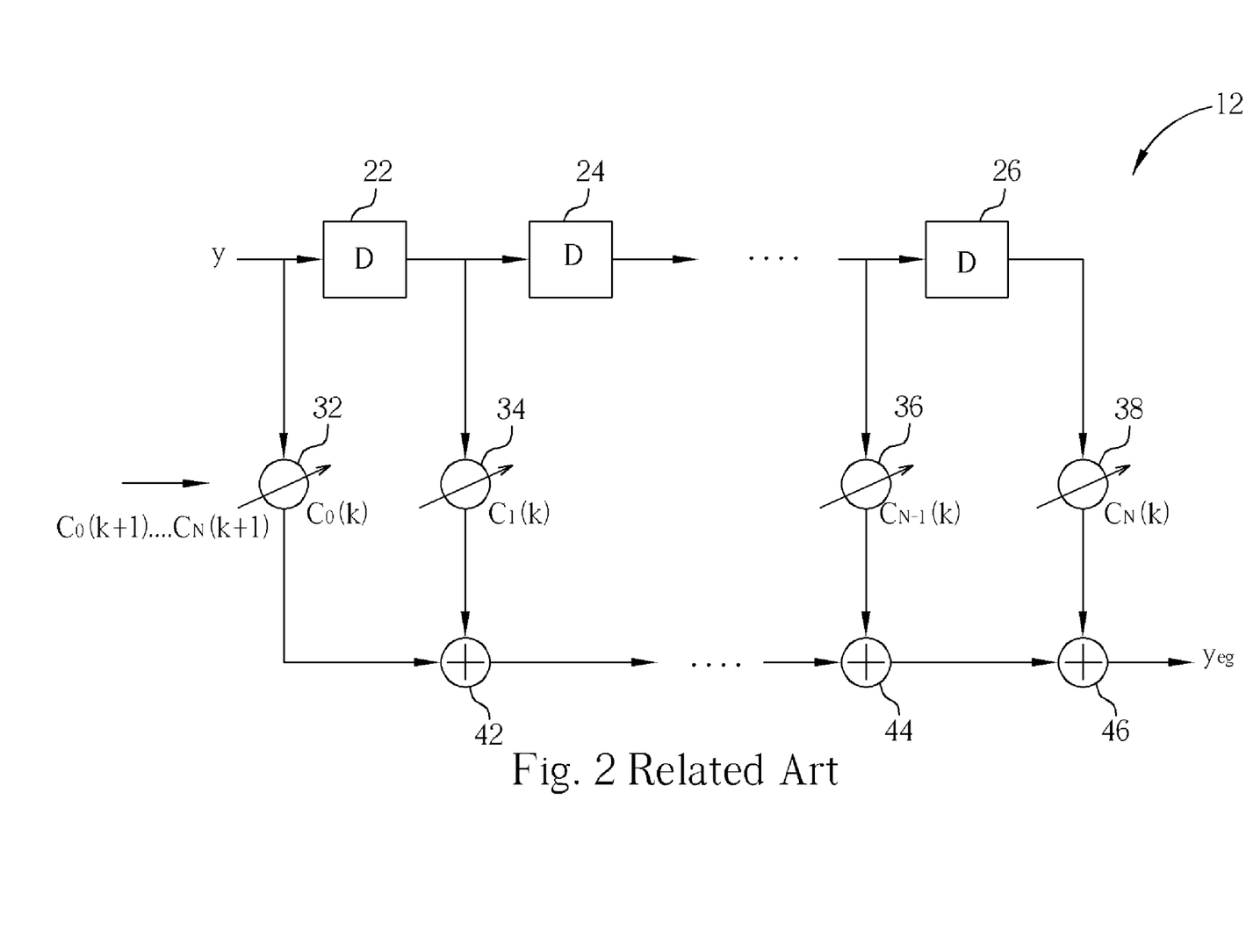
FIG. 2 is schematic diagram of the equalization unit shown in FIG. 1.

Please refer to FIG. 2. FIG. 2 is schematic diagram of the equalization unit 12 shown in FIG. 1. The equalization unit 12 comprises a plurality of delay units 22, 24, 26, a plurality of multipliers 32, 34, 36, 38 with adjustable coefficients $C_0(k)$, $C_1(k), \ldots , C_N(k)$, and a plurality of adders 42, 44, 46. The delay time of the delay units 22, 24, 26 relate to the sampling time of the received signal y. The delay units 22, 24, 26 output a plurality of received signals y(k), y(k-1) ... y(k-N) (i.e., delayed signals), respectively, corresponding to different sampling times. The multipliers 32, 34, 36, 38 respectively multiply the adjustable equalization coefficients $C_0(k)$, $C_1(k), \ldots , C_N(k)$ by the corresponding delay signals y(k), y(k-1) ... y(k-N). The sum of the multiplication result is the equalized signal $y_{eq}$. The operation of the equalization unit 12 is shown in the following equation:

$$y_{eq}(k)=C_0 \cdot y(k)+C_1 \cdot y(k-1)+ \ldots C_N \cdot y(k-N) \qquad \text{Equation (2)}$$

In practice, the error rates of certain received data, and more particularly the received data with level transition, are higher than other received data. However, the related art adaptive equalizers do not address the problem mentioned above. Therefore, if the error rates of the certain received data mentioned above are reduced, the averaged error rates of the communication systems are improved significantly.

SUMMARY

It is therefore an objective of the claimed invention to provide an adaptive equalizer and the related method to solve the problem mentioned above.

According to the claimed invention, an adaptive equalizer is disclosed. The weighted adaptive equalizer comprises: a reference signal generator for generating a reference signal according to a first reference source; an equalization unit for processing a received signal according to a plurality of equalization coefficients to generate an equalized signal; a weighted signal generator for generating a weighted signal according to a second reference source; and a coefficient adapting circuit for adjusting the plurality of equalization coefficients according to the reference signal, the equalized signal, the weighted signal, and the received signal.

According to the claimed invention, an adaptive equalizer is disclosed. The adaptive equalizer comprises: a reference signal generator for generating a reference signal according to a first reference source; an equalization unit for generating an equalized signal by processing a received signal according to a plurality of equalization coefficients; and a coefficient adapting circuit for adjusting the plurality of equalization coefficients according to a projection vector, the reference signal, the equalized signal, and the received signal.

According to the claimed invention, an adaptive equalizing method is disclosed. The adaptive equalizing method comprising: generating a reference signal according to a first reference source; generating an equalized signal by processing a received signal according to a plurality of equalization coefficients; generating a weighted signal according to a second reference source; and adjusting the plurality of equalization coefficients according to the reference signal, the equalized signal, the weighted signal, and the received signal.

According to the claimed invention, an adaptive equalizing method is disclosed. The adaptive equalizing method comprises: generating a reference signal according to a first reference source; generating an equalized signal by processing a received signal according to a plurality of equalization coefficients; and adjusting the plurality of equalization coefficients according to a projection vector, the reference signal, the equalized signal, and the received signal.

The present invention utilizes the weighted signal generator to generate a weighted signal relating to the expected error rate of the received signals, and then the adjustment weight of the equalization coefficients is adjusted according to the weighted signal. In addition, a projecting unit of the adaptive equalizer filters the noises, which induces higher error rates, according to the present invention. Hence, the adaptive equalizer adjusts the equalization coefficients in accordance with the noises that induce higher error rates. As a result, the averaged error rate is reduced significantly according to the present invention.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
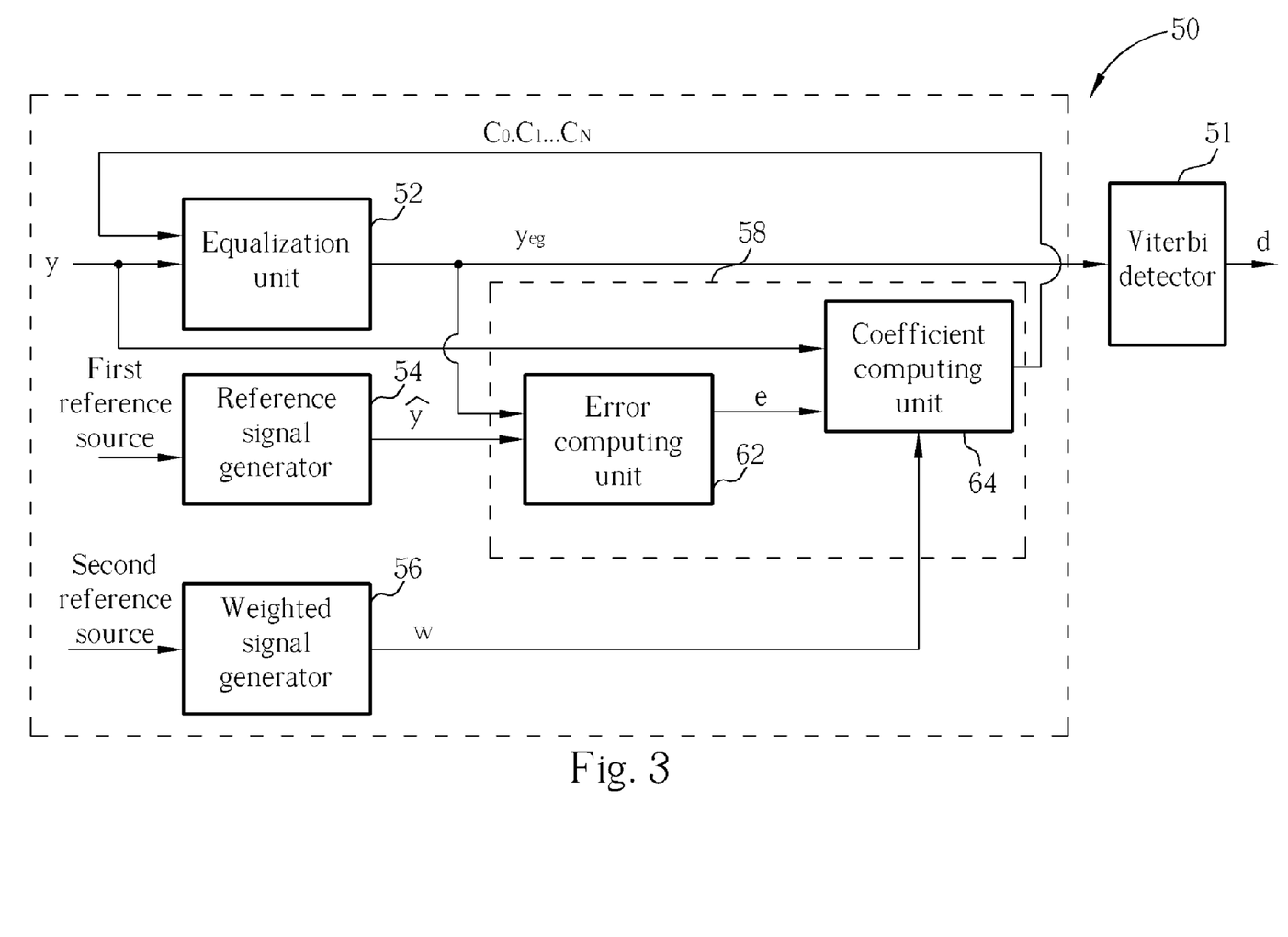
FIG. 3 is a functional block diagram of the weighted adaptive equalizer according to a first embodiment of the present invention.

Please refer to FIG. 3. FIG. 3 is a functional block diagram of the weighted adaptive equalizer 50 according to a first embodiment of the present invention. As shown in FIG. 3, the weighted adaptive equalizer 50 is electrically connected to a Viterbi detector 51, which is utilized to generate a bit stream d by processing the equalized signal $y_{eq}$ outputted from the weighted adaptive equalizer 50. The weighted adaptive equalizer 50 comprises an equalization unit 52, a reference signal generator 54, a weighted signal generator 56, and a coefficient adapting circuit 58. The coefficient adapting circuit 58 comprises an error computing unit 62 and a coefficient computing unit 64. The equalization unit 52 utilizes the plurality of equalization coefficients $C_0, C_1 \ldots, C_N$ to equalize a received signal y to generate an equalized signal $y_{eq}$. The received signal y may be a base-band signal of the wireless communication system and a disc read-back signal.

The reference signal generator 54 utilizes the first reference source to generate a desired signal $\hat{y}$. In the present embodiment, the first reference source may be a bit stream d outputted from the Viterbi detector 51 or another signal utilized by the communication system, such as an output signal of a related art slicer decoder, which generates the output signal according to the received signal y, or the equalized signal $y_{eq}$ corresponding to the received signal y. Please note that owing to the operation of generating the desired signal $\hat{y}$ being well known to people skilled in the art, the description of the operation of the reference signal generator 54 is omitted for the sake of brevity. In other words, any method and apparatus applied in the related art adaptive equalizers generating the desired signal $\hat{y}$ can be applied to the reference signal generator 54 according to the present invention. Assume the bit stream d is utilized as the first reference source according to the present embodiment. Owing to the bit stream d outputted by the Viterbi detector 51 being determined to be a correct decoded data, the signal derived from the bit stream d is determined to be the desired signal $\hat{y}$ of the received signal y. As the channel model is (1,2,2,1), the desired signal $\hat{y}$ is generated with the bit stream d according to the following equation:

$$\hat{y}(k) = 1 \cdot d(k) + 2 \cdot d(k-1) + 2 \cdot d(k-2) + 1 \cdot d(k-3) \qquad \text{Equation (3)}$$

Please note that there may be a difference between the input timings of reference signal and the received signal y. As a result, a delayed unit can be adopted for alleviating the difference between the input timings.

The weighted signal generator 56 utilizes a second reference source to generate a weighted signal w, and drives the coefficient adapting circuit 58 according to the weighted signal w. In the present embodiment, the second reference source may be the bit stream d outputted by the Viterbi detector 51 or other signals utilized by the communication system, such as the received signal y, the output signal of the slicer decoder, which generates the output signal according to the received signal y, the desired signal $\hat{y}$, and the equalized signal $y_{eq}$. The operation of generating the weighted signal w will be detailed in the following paragraph with the input signal being the bit stream d or other signals utilized by the communication system.

Assume the bit stream d outputted by the Viterbi detector 51 is utilized as the second reference source. If the bit stream d corresponds to a specific bit stream, the weighted signal generator 56 generates a weighted signal w corresponding to a specific value. For example, when the specific bit stream has a level transition, the weighted signal generator 56 generates the weighted signal w equal to "1"; otherwise, the weighted signal generator 56 generates the weighted signal w equal to "0" according to the present embodiment. Hence, the coefficient adapting circuit 58 is capable of generating proper equalization coefficients according to the weighted signal w. The operation of the weighted signal generator 56 mentioned above is shown in the following equation:

$$w(k) = \begin{cases} 1, & \text{if } [d_{k-2}\ d_{k-1}\ d\ d_{k+1}\ d_{k+2}] = [00X11] \text{ or } [11X00] \\ 0, & \text{else} \end{cases} \qquad \text{Equation (4)}$$

In Equation (4), X denotes any logic value (i.e., "0" or "1"). In other words, when the weighted signal generator 56 determines the bit stream d is "00011", "00111", "11000", or "11000", the weighted signal generator 56 determines that the bit stream d has a level transition. As a result, the weighted signal generator 56 generates the weighted signal w equal to "1". Please note that, the length of the bit stream can be a system predetermined value of any value, and is not limited by the present embodiment. In addition, the weighted signal w is capable of relating to more than 2 values according to the present invention. With the present embodiment, the weighted signal w only relates to "0" or "1", so the weighted signal generator 56 is utilized as a switch to enable or disable the coefficient adapting circuit 58. If the coefficient adapting circuit 58 is enabled, the coefficient adapting circuit 58 adjusts the equalization coefficients $C_0, C_1, \ldots, C_N$; otherwise, the coefficient adapting circuit 58 does nothing about the equalization coefficients $C_0, C_1, \ldots, C_N$.

In addition, other signals of the communication system can be utilized as the second reference source. Take the equalized signal $y_{eq}$ as an example to describe to operation the weighted signal generator 56. When the equalized signal $y_{eq}$ relates to different values, the weighted signal w is determined to be equal to different values. In the present embodiment, the equalized signal $y_{eq}$ relates to the following values: "6", "4", "2", "0", "-2", "-4", or "-6" equal to the inner product of the four inputted bits and the vector (1 2 2 1). Before generating the inner product, the inputted bits equal to zero are replaced by "-1", and the inputted bits equal to one are replaced by "+1". Therefore, if the inputted bit stream is (1111), the value of the corresponding equalized signal $y_{eq}$ is "6"; if the inputted bit stream is (1110), the value of the corresponding equalized signal $y_{eq}$ is "4"; if the inputted bit stream is (0110), the value of the corresponding equalized signal $y_{eq}$ is "2"; if the inputted bit stream is (1000), the value of the corresponding equalized signal $y_{eq}$ is "-4". In summary, as the bit stream has more level transitions, the absolute value of the corresponding equalized signal $y_{eq}$ is smaller. Owing to the error probability increasing with the number of the level transitions of the bits stream, the weighted signal generator 56 generates the weighted signal w equal to "1" if the equalized signal $y_{eq}$ is "2", "0", or "-2". On the contrary, the weighted signal generator 56 generates the weighted signal w equal to "0" and transmits the weighted signal w to the coefficient adapting circuit 58 if the equalized signal $y_{eq}$ is "6", "4", "-4", or "-6". Therefore the coefficient adapting circuit 58 calculates proper equalization coefficients $C_0, C_1, \ldots, C_N$ according to the weighted signal. The operation of generating the weighted signal w mentioned above is shown in the following equation:

$$w(k) = \begin{cases} 1, & \text{if } -3 < y_{eq} < 3 \\ 0, & \text{else} \end{cases} \quad \text{Equation (5)}$$

In the Equation (5), only two predetermined ranges are utilized to determine the value of the equalized signal $y_{eq}$. The predetermined ranges are $\{y_{eq}|-3<y_{eq}<3\}$ and $\{y_{eq}|y_{eq}<-3 \text{ or } y_{eq}>3\}$. When more than two predetermined ranges are utilized in the present invention, more than two kinds of weighted signal w relating to different values are generated accordingly.

The coefficient adapting circuit 58 utilizes the weighted signal w, the received signal y, the desired signal ŷ, and the equalized signal $y_{eq}$ to calculate proper equalization coefficients $C_0, C_1, \ldots, C_N$, and updates the equalization coefficients $C_0, C_1, \ldots, C_N$ utilized by the weighted adaptive equalizer 50. Hence a more reliable equalized signal $y_{eq}$ is generated according to the updated equalization coefficients $C_0, C_1, \ldots, C_N$. In the present embodiment, firstly, the error computing unit 62 calculates the difference between the desired signal ŷ and the equalized signal $y_{eq}$ to generate an error signal e. Next, the coefficient computing unit 64 utilizes the weighted signal w, the error signal e, and the received signal y to perform a Least Mean Square (LMS) operation to adjust the equalization coefficients $C_0, C_1, \ldots, C_N$. The operation of the coefficient computing unit 64 is shown in the following equation:

$$C_j(k)=C_j(k-1)-\tau \cdot e(k) \cdot w(k) \cdot y(k-j) \quad \text{Equation (6)}$$

In the Equation (6), τ denotes the coefficient adjustment factor, which can be a predetermined value or an adjustable value corresponding to the channel environment. If the weighted adaptive equalizer 50 determines that the expected error rate of the received signal is higher than usual, the weighted signal generator 56 generates the weighted signal w with a greater value. As a result, the coefficient computing unit 64 adjusts the equalization coefficients $C_0, C_1, \ldots, C_N$ significantly. On the contrary, if the weighted adaptive equalizer 50 determines that the expected error rate of the received signal is lower than usual, the weighted signal generator 56 generates the weighted signal w with a lesser value. As a result, the coefficient computing unit 64 adjusts the equalization coefficients $C_0, C_1, \ldots, C_N$ slightly. Next, the newly calculated equalization coefficients $C_0(k), C_1(k) \ldots C_N(k)$ replace the original equalization coefficients $C_0(k-1), C_1(k-1) \ldots C_N(k-1)$ utilized by the weighted adaptive equalizer 50. Please note that the weighted signal w not only can be utilized to control the coefficient computing unit 64, but also can be utilized to control the error computing unit 62 according to the Equation (6). That is the weighted signal w is multiplied by the error signal e firstly, then the multiplication result is transmits to the coefficient computing unit 64 for calculating the proper equalization coefficients $C_0(k), C_1(k) \ldots C_N(k)$. No matter if the utilization of the weighted signal w is controlling the coefficient computing unit 64 or controlling the error computing unit 62, the calculated equalization coefficients $C_0(k), C_1(k) \ldots C_N(k)$ are the same. As a result, the following embodiment of the present invention utilizes the weighted signal w to control the error computing unit 62.

Figure 4:
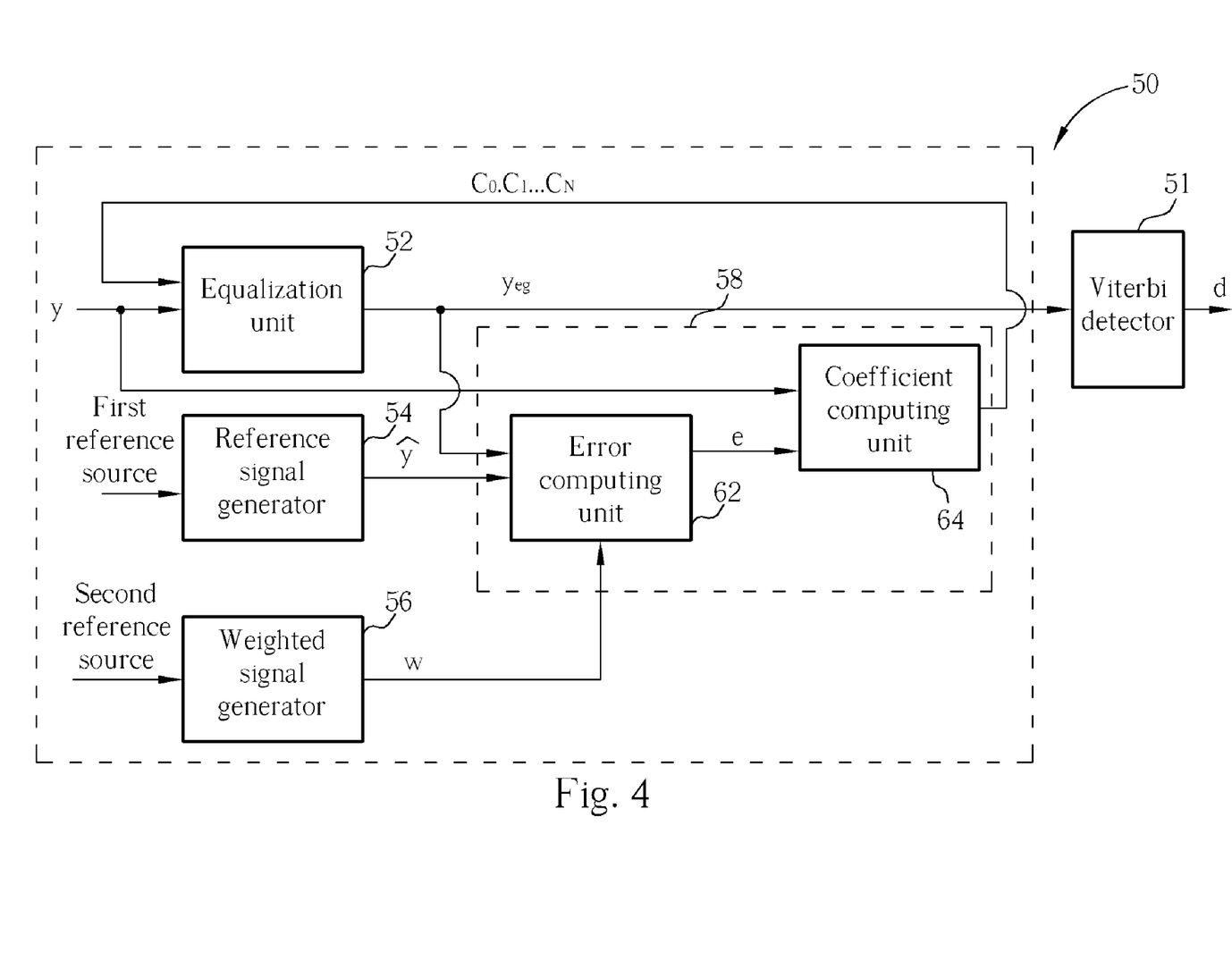
FIG. 4 is a functional block diagram of the weighted adaptive equalizer according to the second embodiment of the present invention.

Please refer to FIG. 4. FIG. 4 is a functional block diagram of the weighted adaptive equalizer 50 according to the second embodiment of the present invention. The difference between the weighted adaptive equalizers shown in FIG. 4 and FIG. 3 is the connection of the weighted signal generator 56. According to the second embodiment, the weighted signal generator 56 is electrically connected to the error computing unit 62. The error computing unit 62 utilizes the weighted signal w to adjust the difference between the desired signal ŷ and the equalized signal $y_{eq}$, and transmits the weighted error signal e to the coefficient computing unit 64. Then the coefficient computing unit 64 performs the LMS operation by utilizing the weighted error signal e for generating and updating the proper equalization coefficients $C_0, C_1 \ldots C_N$.

Figure 5:
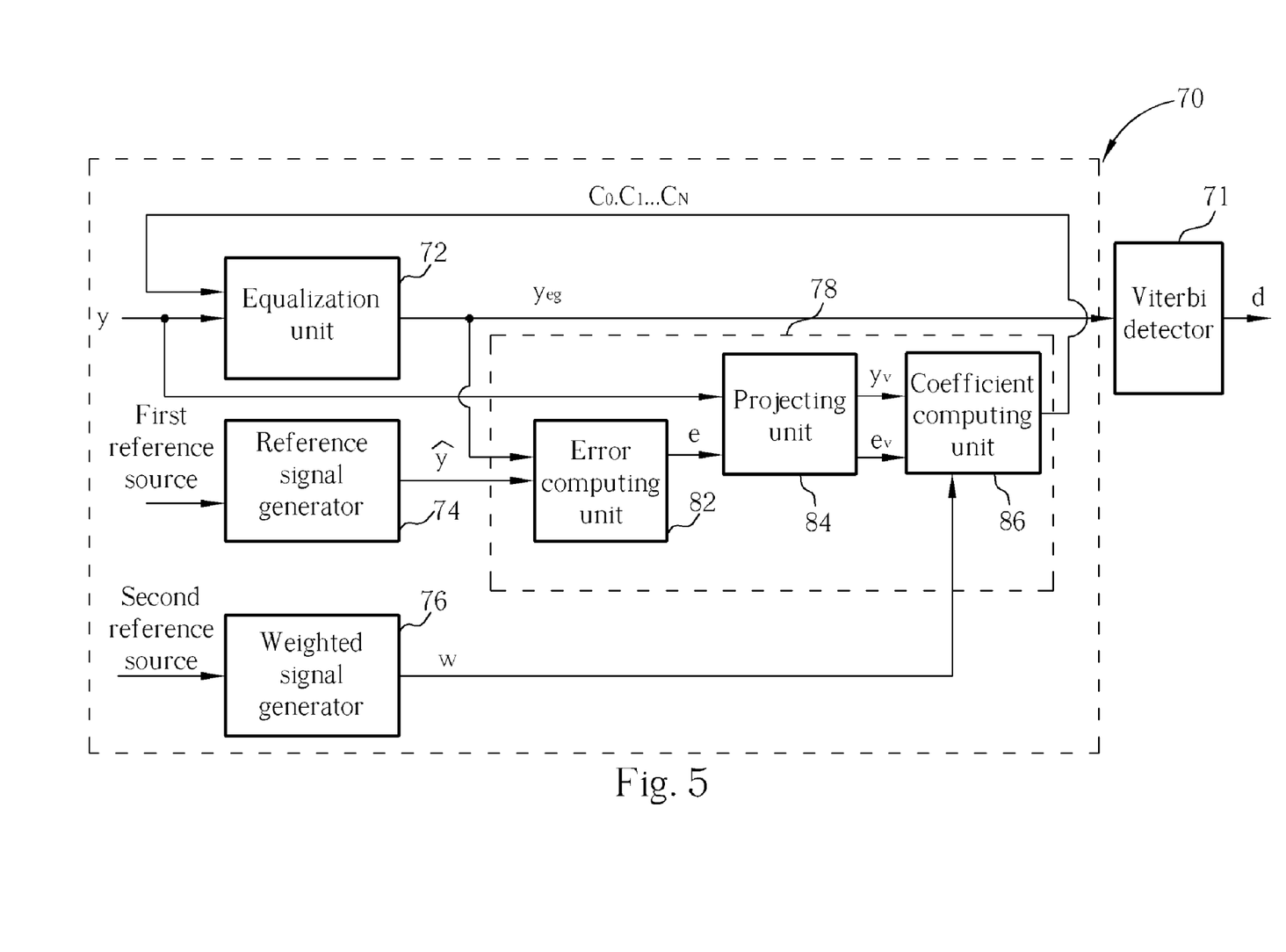
FIG. 5 is functional block diagram of a weighted adaptive equalizer according to a third embodiment of the present invention.

Please refer to FIG. 5. FIG. 5 is functional block diagram of a weighted adaptive equalizer 70 according to a third embodiment of the present invention. With the present embodiment, the weighted adaptive equalizer 70 is electrically connected to a Viterbi detector 71, which processes the equalized signal $y_{eq}$ outputted by the weighted adaptive equalizer 70 to generate a bit stream d. As shown in FIG. 5, the weighted adaptive equalizer 70 comprises an equalization unit 72, a reference signal generator 74, a weighted signal generator 76, and a coefficient adapting circuit 78. The coefficient adapting circuit 78 further comprises an error computing unit 82, a projecting unit 84, and a coefficient computing unit 86. Since the architectures and the operations of the equalization unit 72, the reference signal generator 74, the weighted signal generator 76, and the error computing unit 82 are the same as that of the components having the same names shown in FIG. 3, the detailed description of the equalization unit 72, the reference signal generator 74, the weighted signal generator 76, and the error computing unit 82 is omitted for the sake of brevity.

According to the present embodiment, the difference between the weighted adaptive equalizer 70 and the weighted adaptive equalizer 50 shown in FIG. 3 is the use of the projecting unit 84. The projecting unit 84 is utilized to filter certain kinds of noise or interference, which may increase the error probability of the following decoding procedure (i.e., the operation of the Viterbi detector 71). Therefore, the weighted adaptive equalizer 70 adjusts equalization coefficients $C_0, C_1 \ldots, C_N$ to alleviate these kinds of interference before the interference enters the Viterbi detector 71. For example, "6, 4, 0, −4" and "4, 0, −4, −6" are two normal bit streams. When the bit stream equal to "4, 0, −4, −6" is transmitted through a communication channel, and is affected by an interference equal to "2, 4, 4, 2", the Viterbi detector 71 of the receiver will determine the transmitted bit stream is "6, 4, 0, −4". Hence the following decoding procedure is disturbed by the interference, and an incorrect decision (i.e., incorrect bit stream d) of the decoding procedure is generated. With the present embodiment, the weighted adaptive equalizer 70 utilizes a projection vector $\vec{v}$ to express the format of the interference mentioned above. The projecting unit 84 generates a projected received signal $y_v$ equal to the inner product of the projection vector $\vec{v}$ and the received signal y, and also generates a projected error signal $e_v$ equal to and inner product of the projection vector $\vec{v}$ and the error signal e. The operations of generating the projected received signal $y_v$ and the projected error signal $e_v$ are shown in the following equations:

$$e_v(k)=[e(k-1)e(k)e(k+1)e(k+2)]\cdot[v_1 v_2 v_3 v_4] \quad \text{Equation (7)}$$

$$y_v(k)=[y(k-1)y(k)y(k+1)y(k+2)]\cdot[v_1 v_2 v_3 v_4] \quad \text{Equation (8)}$$

In Equation (7) and Equation (8), the projection vector $[v_1 v_2 v_3 v_4]$ denotes the format of the interference mentioned above. If the channel module is equal to (1,2,2,1), the projection vector $\vec{v}=[v_1 v_2 v_3 v_4]$ is determined to be [1 2 2 1]. The coefficient computing unit 86 utilizes the weighted signal w, projected received signal $y_v$, and the projected error signal $e_v$ to perform the LMS operation to generate the proper equalization coefficients $C_0(k), C_1(k), \ldots, C_N(k)$ accordingly. As a result, the equalization coefficients $C_0(k-1), C_1(k-1), \ldots, C_N(k-1)$ utilized by the equalization unit 72 are updated accordingly. The operation of the coefficient computing unit 86 are shown in the following Equation:

$$C_j(k)=C_j(k-1)-\tau \cdot w(k)\cdot e_v(k)\cdot y_v(k-j) \quad \text{Equation (9)}$$

Please note that the weighted signal w can also be utilized to control the projecting unit 84 according to Equation (9).

Figure 6:
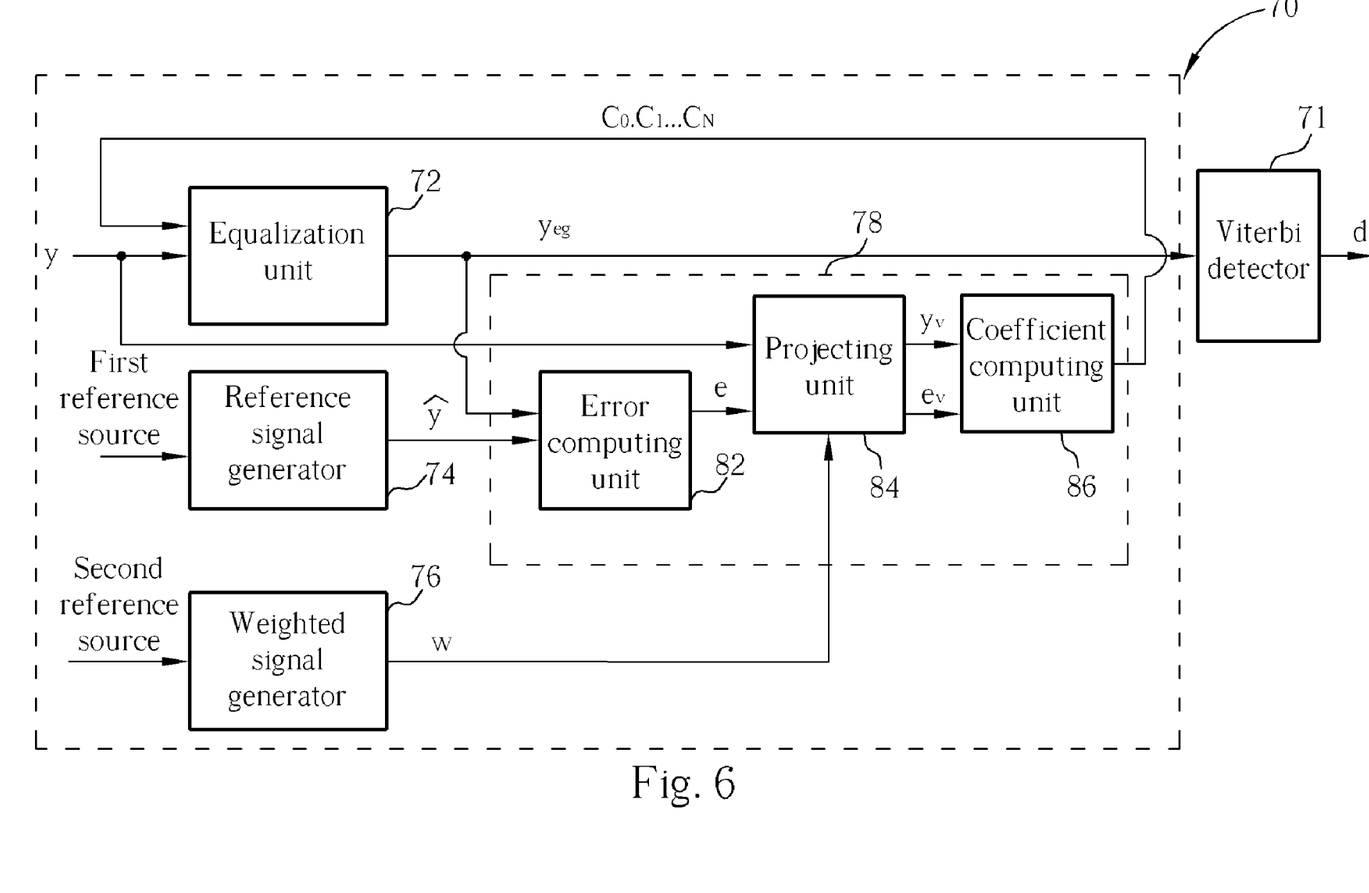
FIG. 6 is a functional block diagram of the weighted adaptive equalizer according to the fourth embodiment of the present invention.

Please refer to FIG. 6. FIG. 6 is a functional diagram of the weighted adaptive equalizer 70 according to the fourth embodiment of the present invention. As shown in FIG. 6, compared with the weighted adaptive equalizer 70 shown in FIG. 5, the difference is the weighted signal generator 76 is electrically connected to the projecting unit 84. The projecting unit 84 adjusts the projected received signal $y_v$ or the projected error signal $e_v$ according to the weighted signal w, and then transmits the adjusting result of projected received signal $y_v$ and projected error signal $e_v$ to the coefficient computing unit 86. Next, the coefficient computing unit 86 performs a LMS operation to generate the proper equalization coefficients $C_0(k), C_1(k), \ldots C_N(k)$ for updating the currently utilized equalization coefficients $C_0(k-1), C_1(k-1), \ldots C_N(k-1)$.

Figure 7:
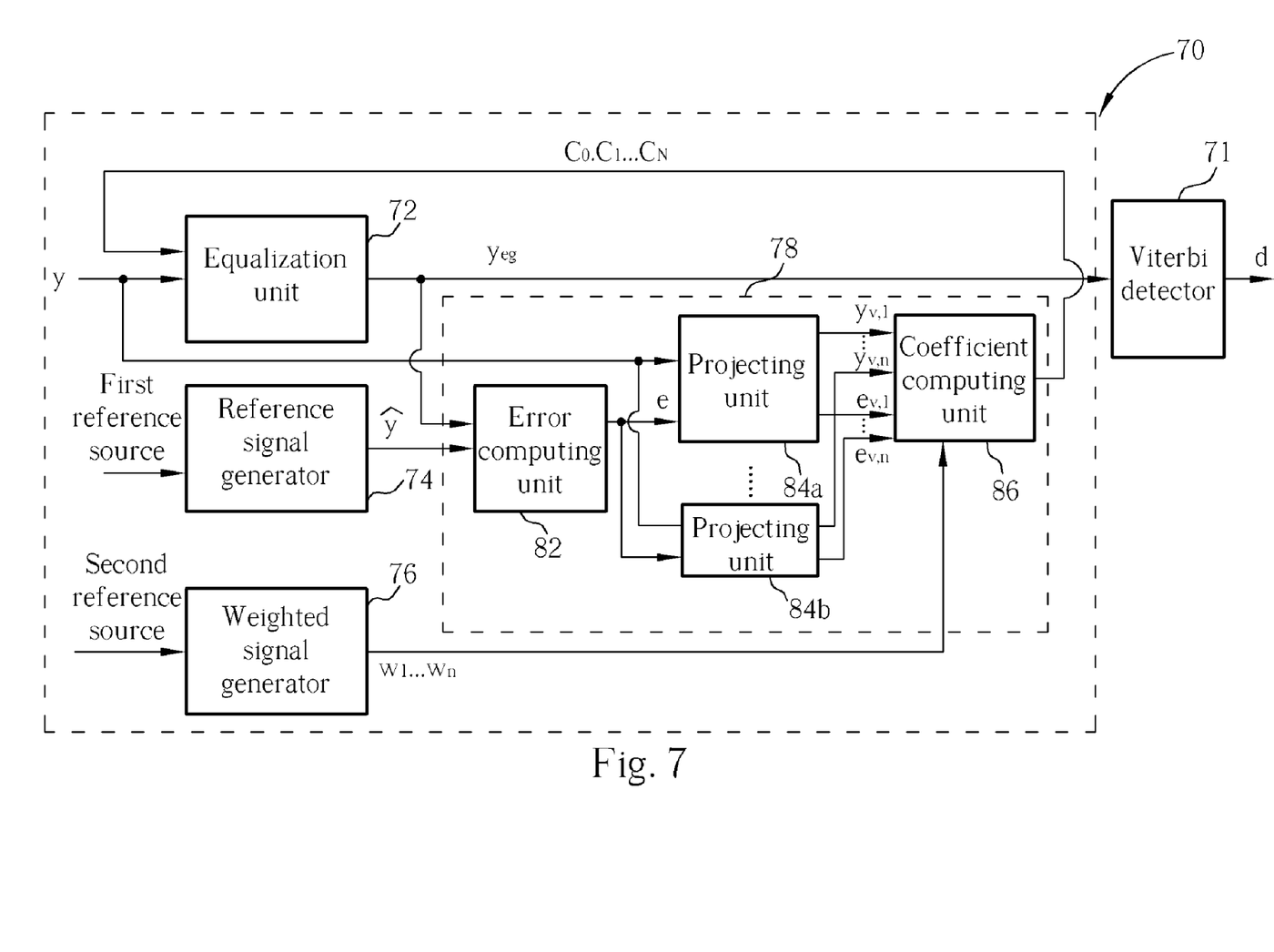
FIG. 7 is a functional block diagram of the weighted adaptive equalizer according to the fifth embodiment of the present invention.

Please refer to FIG. 7. FIG. 7 is a functional block diagram of the weighted adaptive equalizer 70 according to the fifth embodiment of the present invention. Comparing the weighted adaptive equalizer 70 shown in FIG. 6 with the weighted adaptive equalizer 70 shown in FIG. 7, the weighted adaptive equalizer 70 shown in FIG. 6 only comprises one projecting unit 84, but the weighted adaptive equalizer 70 shown in FIG. 7 comprises a plurality of (e.g. M) projecting units 84a, . . . 84b. The operations and architectures of the projecting units 84a, . . . 84b are the same as the operation and architecture of the projecting unit 84 shown in FIG. 6. With the present embodiment, the weighted adaptive equalizer 70 is capable of alleviating M kinds of interferences inducing higher error probability of the following decoding procedure by adopting M projection vectors $\vec{v}_1 \vec{v}_2 \vec{v}_3 \ldots \vec{v}_M$. Assume the channel model equal to (1,2,2,2,1), the projection vectors $\vec{v}_1=[v_1 v_2 v_3 v_4 v_5]=[1\ 2\ 2\ 2\ 1]$ and $\vec{v}_2=[v_1 v_2 v_3 v_4 v_5 v_6 v_7]=[1\ 2\ 1\ 0\ -1\ -2\ -1]$ are adopted. The related operation of generating the projected received signal $y_v$ and the projected error signal $e_v$ are shown in the following equation:

$$e_{v,i}(k)=[e(k-1)e(k)e(k+1)\ldots e(k-2+L_i)]\cdot \vec{v}_i \quad \text{Equation (10)}$$

$$y_{v,i}(k)=[y(k-1)y(k)y(k+1)\ldots y(k-2+L_i)]\cdot \vec{v}_i \quad \text{Equation (11)}$$

In the Equation (10) and Equation (11), $L_i$ denotes the dimension of the projection vector $\vec{v}_i$. The projecting unit 84a generates the projected error signal $e_{v,1}$ and the projected received signal $y_{v,1}$ according to the projection vector $\vec{v}_1$. In the same manner, the projecting unit 84b generates the projected error signal $e_{v,n}$ and the projected received signal $y_{v,n}$ according to the projection vector $\vec{v}_n$. Therefore, the coefficient computing unit 86 adjusts the equalization coefficients $C_0, C_1, \ldots, C_N$ according to the projected error signal $e_{v,1}, \ldots, e_{v,n}$ and the projected received signal $y_{v,1}, \ldots, y_{v,n}$. The operation of adjusting the equalization coefficients $C_0, C_1 \ldots, C_N$ is shown is the following equation:

$$C_j(k)=C_j(k-1)-\tau \cdot (\Sigma_{i=1}^{M} w_i(k)\cdot e_{v,i}(k)\cdot y_{v,i}(k-j)) \quad \text{Equation (12)}$$

In Equation (12), $w_i(k)$ denotes a weighted signal relating to the projection vector $\vec{v}_i$, and each weighted signal $w_i$ is capable of relating to different values according to the corresponding projection vectors $\vec{v}_i$. If the weighted signals $w_i$ are assigned the same value, the weighted signal generator outputs M same output signals $w_i$ (i.e. all projection vectors $\vec{v}_i$ share one output signal w). Please note that, the weighted signal $w_i$ can be adjusted by the coefficient computing unit 86 according to the importance of the corresponding projection vectors $\vec{v}_i$. For example, when the importance of a projection vector $\vec{v}_k$ is greater than usual (i.e. the projection vectors $\vec{v}_k$ effects the correction of the decoding procedure significantly), the corresponding weighted signal $w_k$ is greater than other weighted signals $w_i$.

Figure 8:
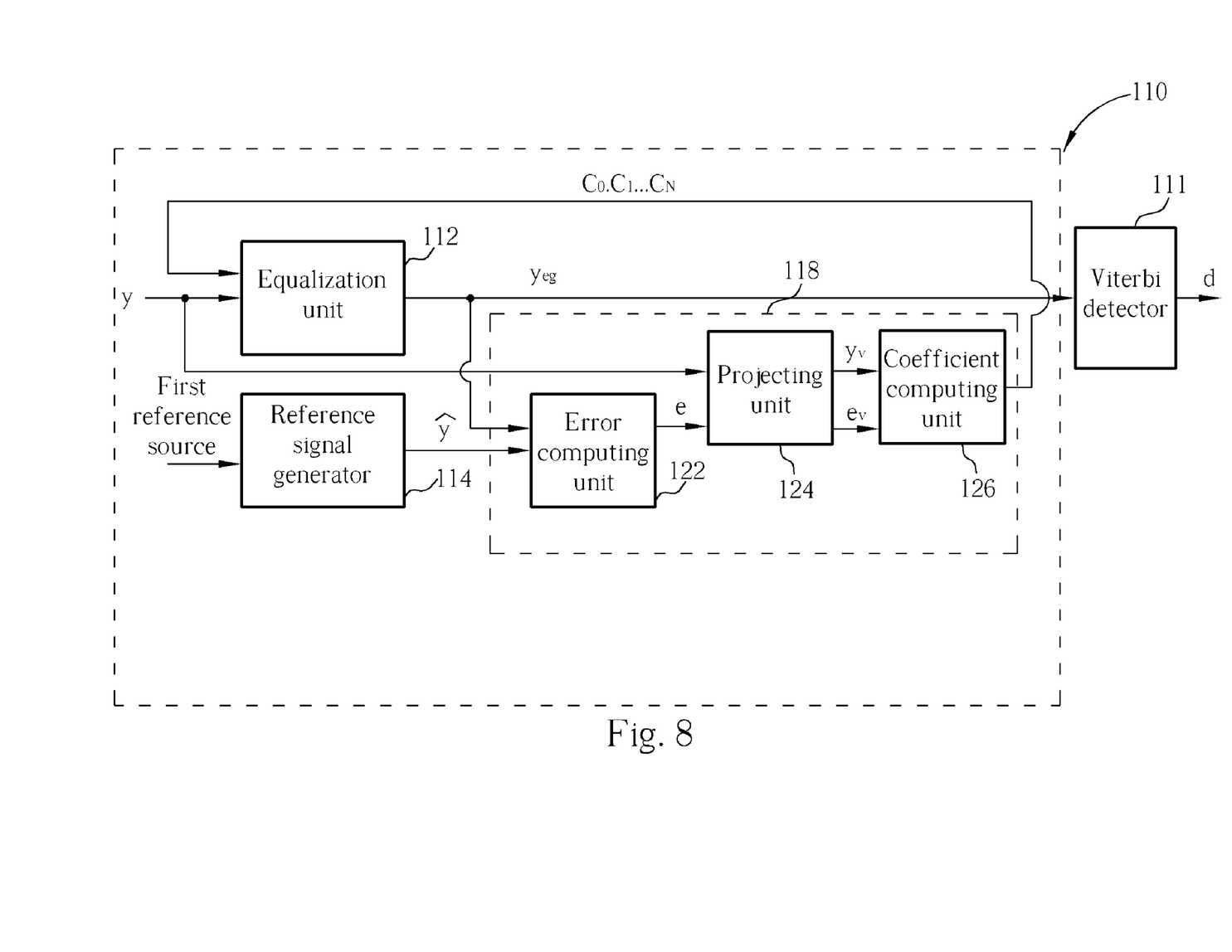
FIG. 8 is a functional block diagram of the third adaptive equalizer according to the sixth embodiment of the present invention.

Please refer to FIG. 8. FIG. 8 is a functional block diagram of the adaptive equalizer 110 according to the sixth embodiment of the present invention. With the present embodiment, the adaptive equalizer 110 is electrically connected to the Viterbi detector 111 utilized to generate a bit stream d by processing the equalized signal $y_{eq}$ outputted by the adaptive equalizer 110. The adaptive equalizer 110 comprises an equalization unit 112, a reference signal generator 114, and a coefficient adapting circuit 118. The coefficient adapting circuit 118 comprises an error computing unit 122, a projecting unit 124, and a coefficient computing unit 126. Since the architectures and operations of the equalization unit 112, the reference signal generator 114, the error computing unit 122, the projecting unit 124, and the coefficient computing unit 126 are the same as the architectures and operations of the components having the same names shown in FIG. 7, the detailed description of the equalization unit 112, the reference signal generator 114, the error computing unit 122, the projecting unit 124, and the coefficient computing unit 126 is omitted for the sake of brevity. Compared with the weighted adaptive equalizer 70 shown in FIG. 5, the adaptive equalizer 110 shown in FIG. 8 does not include a weighted signal generator to simplify the operation of the adaptive equalizer 110. The cost of the system is reduced at the same time. Therefore the coefficient computing unit 126 adjusts equalization coefficients $C_0, C_1, \ldots, C_N$ according to the projected error signal $e_v$ and the projected received signal $y_v$ without a weighted signal. The operation of adjusting the equalization coefficients $C_0, C_1, \ldots, C_N$ is shown in the following equation:

$$C_j(k)=C_j(k-1)-\tau \cdot e_v(k) \cdot y_v(k-j) \quad \text{Equation (13)}$$

Although only one projecting unit is utilized in the adaptive equalizer 110 shown in FIG. 8 according to the present invention, the adaptive equalizer 110 is capable of utilizing numerous projecting units as shown in FIG. 7 according to the present invention.

Compared with the related art, the adaptive equalizer utilizes the weighted signal generator to generate a weighted signal relating to the expected error rate of the received signal. As the error rate of a received signal may be higher than other received signals, the generated weighted signal is greater than usual. Next the greater weighted signal is utilized to control the operations of the error computing unit, projecting unit, and coefficient computing unit. In addition, a projecting unit is utilized to filter certain noises inducing higher error rates, in order to calculate proper equalization coefficients in accordance with the noises mentioned above. In summary, the weighted signal generator and the projecting unit assist the adaptive equalizer to decrease the error rate significantly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adaptive equalizer comprising:
   a reference signal generator for generating a reference signal according to a first reference source;
   an equalization unit for processing a received signal according to a plurality of equalization coefficients to generate an equalized signal;
   a weighted signal generator for generating a weighted signal according to a second reference source; and
   a coefficient adapting circuit for adjusting the plurality of equalization coefficients according to the reference signal, the equalized signal, the weighted signal, and the received signal;
   wherein the coefficient adapting circuit comprises:
      an error computing unit, electrically connected to the equalization unit and the reference signal generator, for generating an error signal corresponding to the difference between the equalized signal and the reference signal;
      a projecting unit, electrically connected to the error computing unit, for generating a projected received signal according to a projection vector and the received signal, and for generating a projected error signal according to the projection vector and the error signal; and
      a coefficient computing unit, electrically connected to the projecting unit and the weighted signal generator, for adjusting the plurality of equalization coefficients according to the weighted signal, the projected error signal, and the projected received signal.

2. The adaptive equalizer of claim 1, wherein the equalization unit is electrically connected to a Viterbi detector utilized to generate an output signal according to the equalized signal, and the output signal of the Viterbi detector is the second reference source.

3. The adaptive equalizer of claim 1, wherein the weighted signal generator compares the second reference source with a bit stream, and generates the weighted signal according to the comparing result.

4. The adaptive equalizer of claim 1, wherein if the weighted signal generator determines that the value of the second reference source is in a predetermined range, the weighted signal generator generates the weighted signal according to a weight of the predetermined range, and the coefficient adapting circuit adjusts the plurality of equalization coefficients according to the weighted signal.

5. The adaptive equalizer of claim 1, wherein the weighted signal generator utilizes the equalized signal as the second reference source.

6. The adaptive equalizer of claim 5, wherein if the weighted signal generator determines that the value of the equalized signal is in a predetermined range, the weighted signal generator generates the weighted signal, and the coefficient adapting circuit adjusts the plurality of equalization coefficients according to the weighted signal.

7. The adaptive equalizer of claim 1, wherein the received signal is utilized as the second reference source.

8. The adaptive equalizer of claim 7, wherein if the weighted signal generator determines that the value of the received signal is in a predetermined range, the weighted signal generator generates the weighted signal, and the coefficient adapting circuit adjusts the plurality of equalization coefficients according to the weighted signal.

9. The adaptive equalizer of claim 1, wherein the reference signal outputted from the reference signal generator is utilized as the second reference source.

10. The adaptive equalizer of claim 8, wherein if the weighted signal generator determines that the value of the reference signal is in a predetermined range, the weighted signal generator generates the weighted signal, and the coefficient adapting circuit adjusts the plurality of equalization coefficients according to the weighted signal.

11. The adaptive equalizer of claim 1, wherein the equalization unit is electrically connected to a Viterbi detector utilized to generate an output signal according to the equalized signal, and the output signal of the Viterbi detector is the first reference source.

12. The adaptive equalizer of claim 1, wherein the reference signal generator utilizes the equalized signal as the first reference source.

13. The adaptive equalizer of claim 1, wherein the reference signal generator utilizes the received signal as the first reference source.

14. The adaptive equalizer of claim 1 utilizing the received signal to generate the first reference source.

15. The adaptive equalizer of claim 1, wherein the received signal is a disc read-back signal.

16. The adaptive equalizer of claim 1, wherein the coefficient adapting circuit comprises:
an error computing unit, electrically connected to the equalization unit, the weighted signal generator, and the reference signal generator, for generating an error signal by adjusting the difference between the reference signal and the equalized signal according to the weighted signal; and
a coefficient computing unit, for adjusting the plurality of equalization coefficients according to the error signal and the received signal.

17. The adaptive equalizer of claim 1, wherein the coefficient adapting circuit comprises:
an error computing unit, electrically connected to the equalization unit and the reference signal generator, for generating an error signal corresponding to the difference between the equalized signal and the reference signal; and
a coefficient computing unit, electrically connected to the error computing unit and the weighted signal generator, for adjusting the plurality of equalization coefficients according to the weighted signal, the error signal and the received signal.

18. An adaptive equalizer comprising:
a reference signal generator for generating a reference signal according to a first reference source;
an equalization unit for processing a received signal according to a plurality of equalization coefficients to generate an equalized signal;
a weighted signal generator for generating a weighted signal according to a second reference source; and
a coefficient adapting circuit for adjusting the plurality of equalization coefficients according to the reference signal, the equalized signal, the weighted signal, and the received signal;
wherein the coefficient adapting circuit comprises:
an error computing unit, electrically connected to the equalization unit and the reference signal generator, for generating an error signal corresponding to the difference between the equalized signal and the reference signal;
a projecting unit, electrically connected to the error computing unit and the weighted signal generator, for generating a projected received signal according to a projection vector and the received signal, and for generating a projected error signal according to the projection vector and the error signal, wherein the projecting unit adjusts the projected received signal or the projected error signal according to the weighted signal; and
a coefficient computing unit, electrically connected to the projecting unit, for adjusting the plurality of equalization coefficients according to the projected error signal and the projected received signal.

19. An adaptive equalizer comprising:
a reference signal generator for generating a reference signal according to a first reference source;
an equalization unit for generating an equalized signal by processing a received signal according to a plurality of equalization coefficients; and
a coefficient adapting circuit for adjusting the plurality of equalization coefficients according to a projection vector, the reference signal, the equalized signal, and the received signal;
wherein the coefficient adapting circuit comprises:
an error computing unit, electrically connected to the equalization unit and the reference signal generator, for generating an error signal corresponding to the difference between the equalized signal and the reference signal;
a projecting unit, electrically connected to the error computing unit, for generating a projected received signal according to the projection vector and the received signal, and for generating a projected error signal according to the projection vector and the error signal; and
a coefficient computing unit, electrically connected to the projecting unit, for adjusting the plurality of equalization coefficients according to the projected error signal and the projected received signal.

20. The adaptive equalizer of claim 19, wherein the received signal is a disc read-back signal.

21. The adaptive equalizer, of claim 19, wherein the equalization unit is electrically connected to a Viterbi detector utilized to generate an output signal according to the equalized signal, and the output signal of the Viterbi detector is the first reference source.

22. The adaptive equalizer of claim 19, wherein the reference signal generator utilizes the equalized signal as the first reference source.

23. The adaptive equalizer of claim 19, wherein the reference signal generator utilizes the received signal as the first reference source.

24. The adaptive equalizer of claim 19 generating the first reference source according to the received signal.

25. An adaptive equalizing method comprising:
generating a reference signal according to a first reference source;
generating an equalized signal by processing a received signal according to a plurality of equalization coefficients;
generating a weighted signal according to a second reference source; and
adjusting the plurality of equalization coefficients according to the reference signal, the equalized signal, the weighted signal, and the received signal;
wherein the step of adjusting the plurality of equalization coefficients comprises:
generating an error signal corresponding to the difference between the equalized signal and the reference signal;
generating a projected received signal according to a projection vector and the received signal;
generating a projected error signal according to the projection vector and the error signal;
adjusting the projected received signal or the projected error signal according to the weighted signal; and
adjusting the plurality of equalization coefficients according to the projected error signal and the projected received signal.

26. The adaptive equalizing method of claim 25 utilizing an output signal of a Viterbi detector as the second reference source, wherein the Viterbi detector generates the output signal according to the equalized signal.

27. The adaptive equalizing method of claim 26, wherein the step of generating the weighted signal comprises:
comparing the second reference source with a bit stream; and generating the weighted signal according to the comparing result.

28. The adaptive equalizing method of claim 26, wherein the step of generating the weighted signal comprises:
   detecting if the value of the second reference source is in a predetermined range; and
   generating the weighted signal according to the detection result to adjust the plurality of equalization coefficients.

29. The adaptive equalizing method of claim 25, wherein the equalized signal is utilized as the second reference source.

30. The adaptive equalizing method of claim 29, wherein the step of generating the weighted signal comprises:
   detecting if the value of the second reference source is in a predetermined range; and
   generating the weighted signal according to the detection result to adjust the plurality of equalization coefficients.

31. The adaptive equalizing method of claim 25, wherein the received signal is utilized as the second reference source.

32. The adaptive equalizing method of claim 31, wherein the step of generating the weighted signal comprises:
   detecting if the value of the received signal is in a predetermined range; and
   generating the weighted signal according to the detection result to adjust the plurality of equalization coefficients.

33. The adaptive equalizing method of claim 25, wherein the reference signal is utilized as the second reference source.

34. The adaptive equalizing method of claim 33, wherein the step of generating the weighted signal comprises:
   detecting if the value of the reference signal is in a predetermined range; and
   generating the weighted signal according to the detection result to adjust the plurality of equalization coefficients.

35. The adaptive equalizing method of claim 25 utilizing an output of a Viterbi detector as the first reference source, wherein the Viterbi detector generates the output signal according to the equalized signal.

36. The adaptive equalizing method of claim 25, wherein the step of generating the reference signal comprises:
   utilizing the equalized signal as the first reference source.

37. The adaptive equalizing method of claim 25, wherein the step of generating the reference signal comprises:
   utilizing the received signal as the first reference source.

38. The adaptive equalizing method of claim 25 utilizing the received signal to generate the first reference source.

39. The adaptive equalizing method of claim 25, wherein the received signal is disc read-back signal.

40. The adaptive equalizing method of claim 25, wherein the step of adjusting the plurality of equalization coefficients comprises:
   generating an error signal by adjusting the difference between the reference signal and the equalized signal according to the weighted signal; and
   adjusting the plurality of equalization coefficients according to the error signal and the received signal.

41. The adaptive equalizing method of claim 25, wherein the step of adjusting the plurality of equalization coefficients comprises:
   generating an error signal corresponding to the difference between the equalized signal and the reference signal; and
   adjusting the plurality of equalization coefficients according to the weighted signal, the error signal and the received signal.

42. An adaptive equalizing method comprising:
   generating a reference signal according to a first reference source;
   generating an equalized signal by processing a received signal according to a plurality of equalization coefficients;
   generating a weighted signal according to a second reference source; and
   adjusting the plurality of equalization coefficients according to the reference signal, the equalized signal, the weighted signal, and the received signal;
   wherein the step of adjusting the plurality of equalization coefficients comprises:
      generating an error signal corresponding to the difference between the equalized signal and the reference signal;
      generating a projected received signal according to a projection vector and the received signal;
      generating a projected error signal according to the projection vector and the error signal; and
      adjusting the plurality of equalization coefficients according to the projected error signal, the projected received signal, and the weighted signal.

43. An adaptive equalizing method comprising:
   generating a reference signal according to a first reference source;
   generating an equalized signal by processing a received signal according to a plurality of equalization coefficients; and
   adjusting the plurality of equalization coefficients according to a projection vector, the reference signal, the equalized signal, and the received signal;
wherein the step of adjusting the plurality of equalization coefficients comprises:
   generating an error signal corresponding to the difference between the equalized signal and the reference signal;
   generating a projected received signal according to the projection vector and the received signal;
   generating a projected error signal according to the projection vector and the error signal; and
   adjusting the plurality of equalization coefficients according to the projected error signal and the projected received signal.

44. The adaptive equalizing method of claim 43, wherein the received signal is a disc read-back signal.

45. The adaptive equalizing method of claim 43 utilizing an output signal of a Viterbi detector as the first reference source, wherein the Viterbi detector generates the output signal according to the equalized signal.

46. The adaptive equalizing method of claim 43, wherein the step of generating the reference signal comprises:
   utilizing the equalized signal as the first reference source.

47. The adaptive equalizing method of claim 43, wherein the step of generating the reference signal comprises:
   utilizing the received signal as the first reference source.

48. The adaptive equalizing method of claim 43 utilizing the received signal to generate the first reference source.

49. The adaptive equalizer of claim 1, wherein the weighted signal generator is for generating a first specific value of the weighted signal when the second reference source corresponds to a level transition, and for generating a second specific value of the weighted signal when the second reference source does not correspond to a level transition.

50. The adaptive equalizer of claim 1, wherein the weighted signal generator is for operating as a switch to enable and disable the coefficient adapting circuit according to the weighted signal.

51. The adaptive equalizing method of claim 25, further comprising:
  generating a first specific value of the weighted signal when the second reference source corresponds to a level transition; and
  generating a second specific value of the weighted signal when the second reference source does not correspond to a level transition.

52. The adaptive equalizing method of claim 25, further comprising enabling and disabling the adjusting of the equalization coefficients according to the weighted signal.

53. An adaptive equalizer comprising:
  a reference signal generator for generating a reference signal according to a first reference source;
  an equalization unit for processing a received signal according to a plurality of equalization coefficients to generate an equalized signal;
  a weighted signal generator for generating a weighted signal according to a second reference source; and
  a coefficient adapting circuit for adjusting the plurality of equalization coefficients according to the reference signal, the equalized signal, the weighted signal, and the received signal, wherein the coefficient adapting circuit comprises:
    an error computing unit, electrically connected to the equalization unit and the reference signal generator, for generating an error signal corresponding to the difference between the equalized signal and the reference signal; and
    a coefficient computing unit, electrically connected to the error computing unit and the weighted signal generator, for adjusting the plurality of equalization coefficients according to the weighted signal, the error signal and the received signal;
  wherein the weighted signal is generated according to level transition of a signal from the second reference source.

54. An adaptive equalizer comprising:
  a reference signal generator for generating a reference signal according to a first reference source;
  an equalization unit for processing a received signal according to a plurality of equalization coefficients to generate an equalized signal;
  a weighted signal generator for generating a weighted signal according to a second reference source; and
  a coefficient adapting circuit for adjusting the plurality of equalization coefficients according to the reference signal, the equalized signal, the weighted signal, and the received signal, wherein the coefficient adapting circuit comprises:
    an error computing unit, electrically connected to the equalization unit and the reference signal generator, for generating an error signal corresponding to the difference between the equalized signal and the reference signal;
    a projecting unit, electrically connected to the error computing unit, for generating a projected received signal according to a projection vector and the received signal, and for generating a projected error signal according to the projection vector and the error signal; and
    a coefficient computing unit, electrically connected to the projecting unit and the weighted signal generator, for adjusting the plurality of equalization coefficients according to the weighted signal, the projected error signal, and the projected received signal.

55. An adaptive equalizing method comprising:
  generating a reference signal according to a first reference source utilizing a reference signal generator;
  processing a received signal according to a plurality of equalization coefficients to generate an equalized signal utilizing an equalization unit;
  generating a weighted signal according to a second reference source utilizing a weighted signal generator;
  adjusting the plurality of equalization coefficients according to the reference signal, the equalized signal, the weighted signal, and the received signal utilizing a coefficient adapting circuit;
    generating an error signal corresponding to the difference between the equalized signal and the reference signal; and
    adjusting the plurality of equalization coefficients according to the weighted signal, the error signal, and the received signal;
  wherein the weighted signal is generated according to level transition of a signal from the second reference source.

56. An adaptive equalizing method comprising:
  generating a reference signal according to a first reference source utilizing a reference signal generator;
  processing a received signal according to a plurality of equalization coefficients to generate an equalized signal utilizing an equalization unit;
  generating a weighted signal according to a second reference source utilizing a weighted signal generator;
  adjusting the plurality of equalization coefficients according to the reference signal, the equalized signal, the weighted signal, and the received signal utilizing a coefficient adapting circuit;
  generating an error signal corresponding to the difference between the equalized signal and the reference signal;
  generating a projected received signal according to a projection vector and the received signal, and for generating a projected error signal according to the projection vector and the error signal; and
  adjusting the plurality of equalization coefficients according to the weighted signal, the projected error signal, and the projected received signal.

* * * * *

UNITED STATES PATENT AND TRADEMARK OFFICE
CERTIFICATE OF CORRECTION

PATENT NO. : 7,583,729 B2
APPLICATION NO. : 11/161532
DATED : September 1, 2009
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 966 days.

Signed and Sealed this

Fourteenth Day of September, 2010

David J. Kappos
*Director of the United States Patent and Trademark Office*